United States Patent
Sethi et al.

(10) Patent No.: US 12,411,881 B2
(45) Date of Patent: Sep. 9, 2025

(54) DETERMINING INPUT SENTIMENT BY AUTOMATICALLY PROCESSING TEXT DATA AND NON-TEXT DATA USING ARTIFICIAL INTELLIGENCE TECHNIQUES

(71) Applicant: Dell Products L.P., Round Rock, TX (US)

(72) Inventors: Parminder Singh Sethi, Punjab (IN); Praveen Kumar, Uttar Pradesh (IN)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 18/120,721

(22) Filed: Mar. 13, 2023

(65) Prior Publication Data

US 2024/0311413 A1     Sep. 19, 2024

(51) Int. Cl.
| | |
|---|---|
| *G06F 16/35* | (2025.01) |
| *G06F 40/284* | (2020.01) |
| *G06V 40/16* | (2022.01) |
| *G06V 40/20* | (2022.01) |
| *G10L 15/26* | (2006.01) |

(52) U.S. Cl.
CPC ............ *G06F 16/35* (2019.01); *G06F 40/284* (2020.01); *G10L 15/26* (2013.01); *G06V 40/176* (2022.01); *G06V 40/20* (2022.01)

(58) Field of Classification Search
CPC ........ G06F 16/35; G06F 40/284; G06F 40/30; G06F 40/35; G06F 40/10; G10L 15/26; G06V 40/176; G06V 40/20
See application file for complete search history.

(56) References Cited

U.S. PATENT DOCUMENTS

| | | | |
|---|---|---|---|
| 11,501,794 B1* | 11/2022 | Kim | G10L 15/1815 |
| 2006/0024105 A1 | 2/2006 | King | |
| 2017/0262431 A1* | 9/2017 | Alam | G06F 40/30 |
| 2020/0104369 A1* | 4/2020 | Bellegarda | G06F 40/30 |
| 2020/0394478 A1* | 12/2020 | Malak | G06V 30/2272 |
| 2021/0104245 A1* | 4/2021 | Aguilar Alas | G10L 15/16 |
| 2021/0334467 A1* | 10/2021 | Wan | G06N 20/10 |
| 2022/0310083 A1* | 9/2022 | Mohanty | G06N 5/02 |
| 2023/0004830 A1* | 1/2023 | Arevalo | G06N 3/0464 |

FOREIGN PATENT DOCUMENTS

| | | | |
|---|---|---|---|
| JP | 4560299 B2 | 10/2010 | |
| JP | 4979901 B2 | 7/2012 | |

* cited by examiner

*Primary Examiner* — Yogeshkumar Patel
(74) *Attorney, Agent, or Firm* — Ryan, Mason & Lewis, LLP

(57) ABSTRACT

Methods, apparatus, and processor-readable storage media for determining input sentiment by processing text data and non-text data using artificial intelligence techniques are provided herein. An example computer-implemented method includes dividing user input data into at least a first set of text data and a set of non-text data; converting at least a first portion of the non-text data into at least a second set of text data; classifying at least a portion of the at least a first set of text data and at least a portion of the at least a second set of text data in accordance with sentiment-related categories using a first set of artificial intelligence techniques; classifying at least a second portion of the non-text data in accordance with the sentiment-related categories using a second set of artificial intelligence techniques; and performing automated actions based on the classifying of the text data and/or the non-text data.

20 Claims, 6 Drawing Sheets

DETERMINING INPUT SENTIMENT BY AUTOMATICALLY PROCESSING TEXT DATA AND NON-TEXT DATA USING ARTIFICIAL INTELLIGENCE TECHNIQUES

FIELD

The field relates generally to information processing systems, and more particularly to techniques for data processing in such systems.

BACKGROUND

Enterprises and other organizations commonly receive feedback and/or other types of input from users during various stages of user experiences, and understanding such user input often represents an important task. However, conventional user input processing techniques typically require resource-intensive and error-prone approaches to process and understand user input provided in the form of image data and/or video data.

SUMMARY

Illustrative embodiments of the disclosure provide techniques for determining input sentiment by automatically processing text data and non-text data using artificial intelligence techniques.

An exemplary computer-implemented method includes dividing at least a portion of user input data into at least a first set of text data and at least one set of non-text data, and converting at least a first portion of the at least one set of non-text data into at least a second set of text data. The method also includes classifying at least a portion of the at least a first set of text data and at least a portion of the at least a second set of text data in accordance with one or more sentiment-related categories using a first set of one or more artificial intelligence techniques. Additionally, the method includes classifying at least a second portion of the at least one set of non-text data in accordance with the one or more sentiment-related categories using a second set of one or more artificial intelligence techniques. Further, the method includes performing one or more automated actions based at least in part on one or more of the classifying of the text data and the classifying of the non-text data.

Illustrative embodiments can provide significant advantages relative to conventional user input processing techniques. For example, problems associated with resource-intensive and error-prone approaches are overcome in one or more embodiments through automatically determining input sentiment by processing text data and non-text data using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
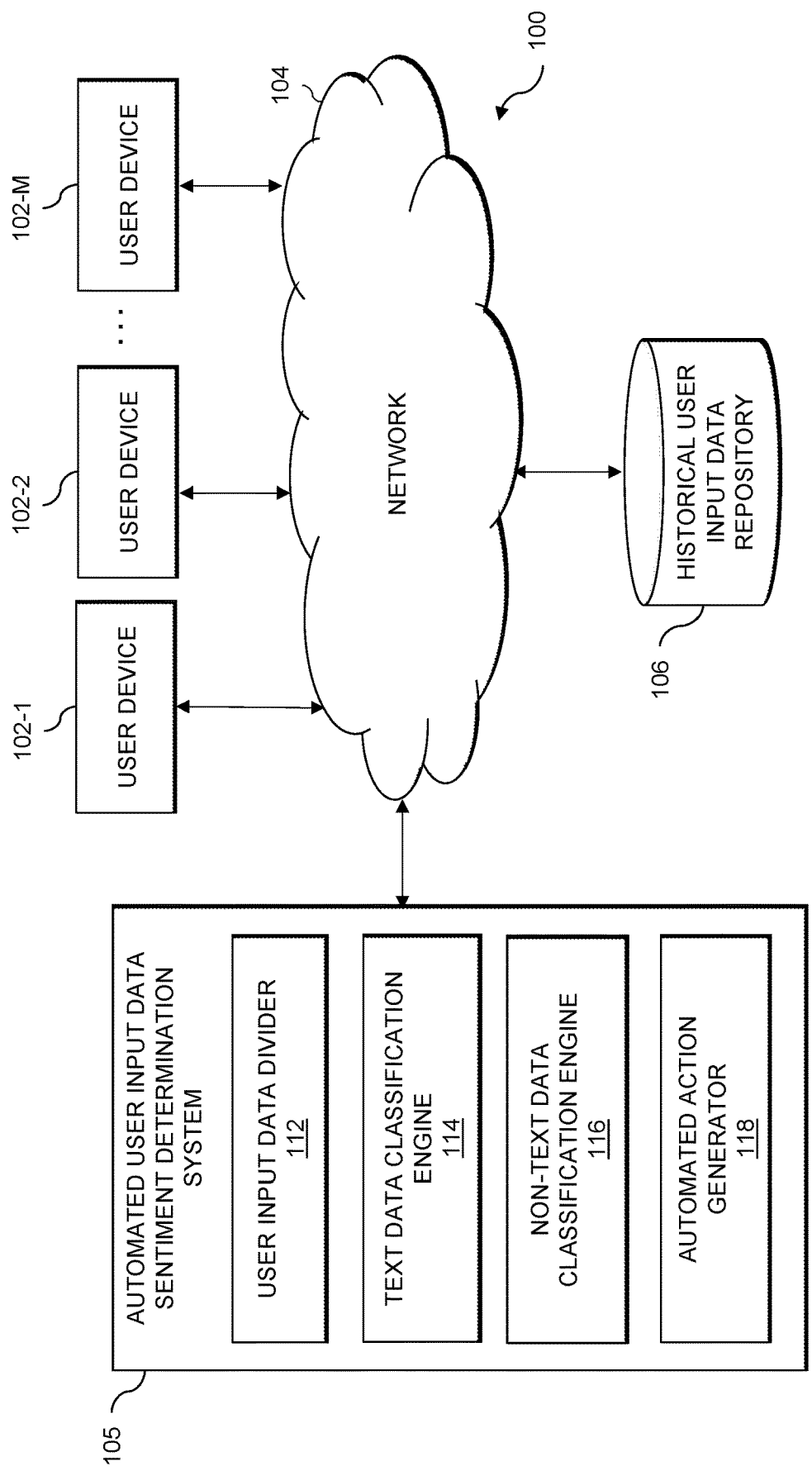
FIG. 1 shows an information processing system configured for determining input sentiment by automatically processing text data and non-text data using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated user input data sentiment determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated user input data sentiment determination system 105 can have an associated historical user input data repository 106 configured to store data pertaining to user comments, user feedback, user reviews and/or other user communications and input data.

The historical user input data repository 106 in the present embodiment is implemented using one or more storage systems associated with automated user input data sentiment determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated user input data sentiment determination system 105 are one or more input-output devices, which illustratively comprise keyboards, displays or other types of input-output devices in any combination. Such input-output devices can be used, for example, to support one or more user interfaces to automated user input data sentiment determination system 105, as well as to support communication between automated user input data sentiment determination system 105 and other related systems and devices not explicitly shown.

Additionally, automated user input data sentiment determination system 105 in the FIG. 1 embodiment is assumed to be implemented using at least one processing device. Each such processing device generally comprises at least one processor and an associated memory, and implements one or more functional modules for controlling certain features of automated user input data sentiment determination system 105.

More particularly, automated user input data sentiment determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated user input data sentiment determination system 105 to communicate over the network 104 with the user devices 102, and illustratively comprises one or more conventional transceivers.

The automated user input data sentiment determination system 105 further comprises user input data divider 112, text data classification engine 114, non-text data classification engine 116, and automated action generator 118.

It is to be appreciated that this particular arrangement of elements 112, 114, 116 and 118 illustrated in automated user input data sentiment determination system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for determining input sentiment by automatically processing text data and non-text data using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated user input data sentiment determination system 105 and historical user input data repository 106 can be on and/or part of the same processing platform.

An exemplary process utilizing elements 112, 114, 116 and 118 of an example automated user input data sentiment determination system 105 in computer network 100 will be described in more detail with reference to the flow diagram of FIG. 4.

Accordingly, at least one embodiment includes determining input sentiment by automatically processing text data and non-text data using artificial intelligence techniques. As further detailed herein, such an embodiment includes generating and/or implementing a framework for decoding user sentiments from the various unstructured and graphical datasets. Such an embodiment can also include converting non-text user input (e.g., user feedback, in the form of image data and/or video data, pertaining to one or more products and/or one or more services) into text data, and processing the resulting text data to improve user experiences and/or user satisfaction.

Sentiment analysis, also referred to as opinion mining, includes text mining techniques wherein computational study of user input (e.g., opinions, reviews, emotions toward products and services, etc.) is carried out. Sentiment analysis aims to determine sentiments expressed by users through various forms of user input, and classify such determined sentiments (e.g., with respect to polarity).

Accordingly, one or more embodiments include obtaining data (e.g., user inputs) from various sources (e.g., enterprise websites, message boards, social media sources, etc.). Subsequently, as further detailed herein, such an embodiment includes converting non-text data (from the obtained data) into text data and/or sentiment features which can be used for further analysis. For example, at least one embodiment can include obtaining data from one or more social media sources, extracting relevant data therefrom (e.g., user inputs pertaining to one or more particular enterprise products and/or services), preprocessing such extracted data (e.g., cleaning the extracted data), storing the preprocessed data (e.g., in at least one database to be used in connection with one or more artificial intelligence techniques), converting non-text data from the stored data into text data, classifying at least a portion of the text data (e.g., original text data and/or converted text data) in connection with one or more sentiment-related categories, and storing the classified text data in at least one database (e.g., to be used in connection with one or more automated actions and/or further processing).

As further detailed herein, one or more embodiments include dividing user input (e.g., user feedback, user reviews of one or more products and/or services, etc.) into multiple elements including, for example, text data, video data (e.g., graphics interchange format (GIF) data), and image data. Such an embodiment also includes executing one or more artificial intelligence models (e.g., at least one ensemble learning model) in connection with the divided user input data. Additionally or alternatively, at least one embodiment includes creating features based at least in part on the divided user input data and executing at least one machine learning model on at least a portion of the features. Such features can, for example, be in the form of non-correlated numeric matrices, which can be used by the at least one machine learning model.

In one or more embodiments, text-based sentiment analysis can include processing text data using artificial intelligence techniques such as, for example, support vector machines (SVMs), random forest techniques, etc. For example, such an embodiment can include merging text-based user input data (e.g., user comments or other feedback) at one or more levels. For instance, data can be received and/or obtained in JavaScript object notation (JSON) format from different sources, and such an embodiment can include converting (e.g., using one or more python scripts) the unstructured data into a structured data format with one or more rows and one or more columns.

Additionally, to make obtained data suitable for machine interpretation, at least one embodiment includes applying one or more data cleaning techniques. Such data cleaning techniques can include, for example, normalizing text and removing stop words. Also, data cleaning techniques can include stemming, which includes grouping words by their root stem, and/or lemmatization, which groups words based on one or more root definitions.

Text-based sentiment analysis can also include text data tokenization, which includes tokenizing one or more sentences into one or more words, and which can be mono-gram-based (i.e., single word-based), bi-gram-based (i.e., two word-based), and/or n-gram-based (i.e., n-word-based). Further, text-based sentiment analysis can include creating at least one numeric matrix using, for example, term frequency (TF) techniques and/or term frequency-inverse document frequency (TF-IDF) techniques. Accordingly, in accordance with one or more embodiments, using machine learning models requires the conversion of text into numeric vectors. Such an embodiment can perform such text conversion, for example, using TF techniques, which generate and/or implement at least one count vector of all text, and/or using TF-IDF techniques, which generate and/or implement at least one numerical statistic intended to reflect how important a word is to a document. TF-IDF techniques show and/or determine the frequency of any term (t) with respect to a corresponding document (d), as well as measure the informativeness of the term (t). Additionally, one or more embodiments can also include taking the log of IDF, and ultimately determining a TF-IDF score by multiplying TF and IDF, represented by the following equation:

$$tf - idf(t, d) = tf(t, d) * \log(N/(df + 1))$$

wherein tf represents term frequency, idf represents inverse document frequency, N represents the number of documents (e.g., rows) in a given dataset, and df represents document frequency.

As noted above, one or more embodiments can include using SVMs, which include at least one set of supervised learning methods used for sentiment classification. Further, SVMs are utilized in such embodiments due, for example, to effectiveness in cases wherein the number of dimensions is greater than the number of documents, as well as memory efficiency.

In one or more embodiments, image-based and/or video-based (e.g., GIF-based) sentiment analysis can include using at least one convolutional neural network (CNN) with one or more fine-tuned features (e.g., the extraction of data from existing raw data in order to render the data more relevant to the matter at hand). In such an embodiment, processing image-based and/or video-based input can become complex due at least in part to the dynamic nature of the input data. Accordingly, such an embodiment includes determining and/or creating one or more features. Such a feature creation process can include creating a frame from an image in accordance with a given temporal parameter (e.g., every 30 milliseconds (ms)). Next, for each frame, a determination is made regarding the presence of one or more facial gestures (e.g., if the mouth is open (indicating laughing, happiness, etc.) and/or one or more body gestures (e.g., if a hand is showing thumbs up or thumbs down, etc.). Mapping such gestures to at least one given feature can include using at least one CNN, wherein determined feature values can be associated with different user emotions and/or sentiments.

In accordance with such an embodiment, the at least one CNN (e.g., a deep learning model) includes multiple layers and each layer performs a specific transformation in connection with the data. By way of example, the first layer can include a convolutional layer, wherein features are extracted from an image, preserving the association between pixels. Convolution of an image uses one or more filters to perform operations such as, for example, sharpening the blur of the image, edge detection, etc. Another layer can include a rectified linear unit (ReLU) layer, which introduces non-linearity in the CNN. Next, a pooling layer can help in dimensionality reduction, and spatial pooling and/or sub-sampling can be implemented as part of a pooling layer, which reduces the dimensionality of mapping data but also retains the information required. All connected layers can flatten a given matrix into a vector, which becomes an input for a fully connected layer. From here, a training process starts and one or more similar patterns are mapped against a training set of data.

Image-based and/or video-based sentiment analysis can also include audio data analysis. In at least one embodiment, audio data analysis includes implementing speech recognition (i.e., speech-to-text) conversion techniques. In one or more embodiments, speech recognition techniques convert sound waves into electronic signals. Next, those signals are converted into digital data using at least one analog-to-digital converter. Once digitalized, such an output helps in converting speech into text for further natural language processing algorithms for sentiment assignment. By way merely of example and illustration, such an embodiment can include using python libraries, in connection with audio data analysis, such as pydub (e.g., to read audio files), SpeechRecognition (e.g., for speech-to-text conversion), and Natural Language Toolkit (NLTK) (e.g., for feature extraction from converted text, final modeling and sentiment analysis).

Figure 2:
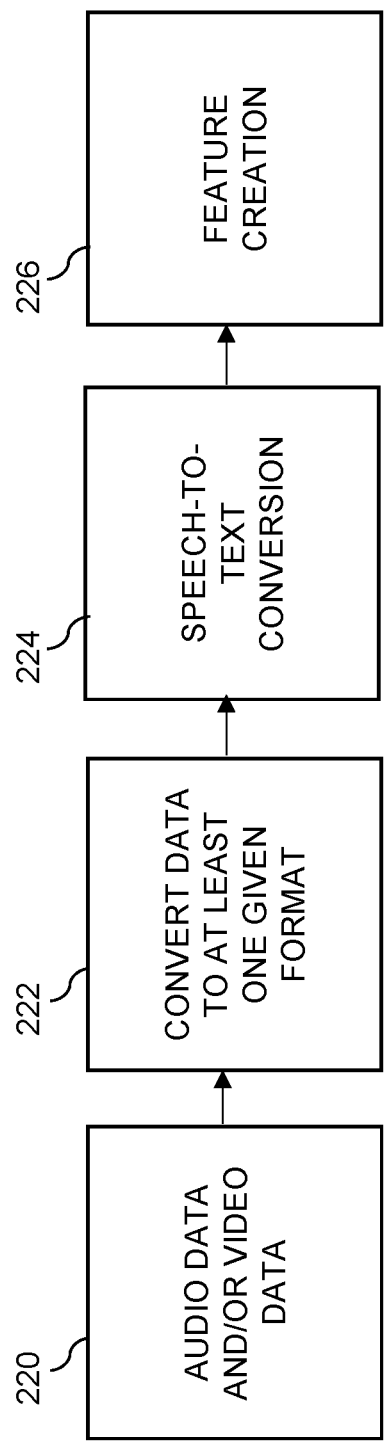
FIG. 2 shows a flow diagram for processing audio data and/or video data in an illustrative embodiment.

FIG. 2 shows a flow diagram for processing audio data and/or video data in an illustrative embodiment. By way of illustration, FIG. 2 depicts audio data and/or video data 220, which are converted in step 222 into at least one given format (e.g., a .wav file format). At least a portion of the converted data can then be transformed by processing such data using one or more speech-to-text conversion techniques in step 224. Further, in step 226 and based at least in part on the output of the speech-to-text conversion techniques, one or more features can be created pertaining to the audio data and/or video data 220.

Because, in one or more embodiments, features can be extracted (as detailed above) in a sequential manner, such an embodiment can include using at least one CNN for polarity calculations. As used herein, sentiment polarity for any text defines the direction of the expressed sentiment (e.g., it determines if the text conveys a positive sentiment, negative sentiment and/or neutral sentiment). In one or more embodiments, sentiment polarity can be calculated as a probabilistic score which decides the polarity of any text toward given sentiments. For example, an illustrative polarity score can be represented as follows: {Negative: 0.457, Neutral: 0.523, Positive: 0.019}.

Additionally or alternatively, modality can play a role in analyzing user input sentiments using audio and video data. For example, after the conversion of video data in the form of image frames and review data received as images, one or more image classification models are used. As such, visual sentiment analysis can be formulated as image classification using one or more deep learning techniques (e.g., CNNs).

Figure 3:
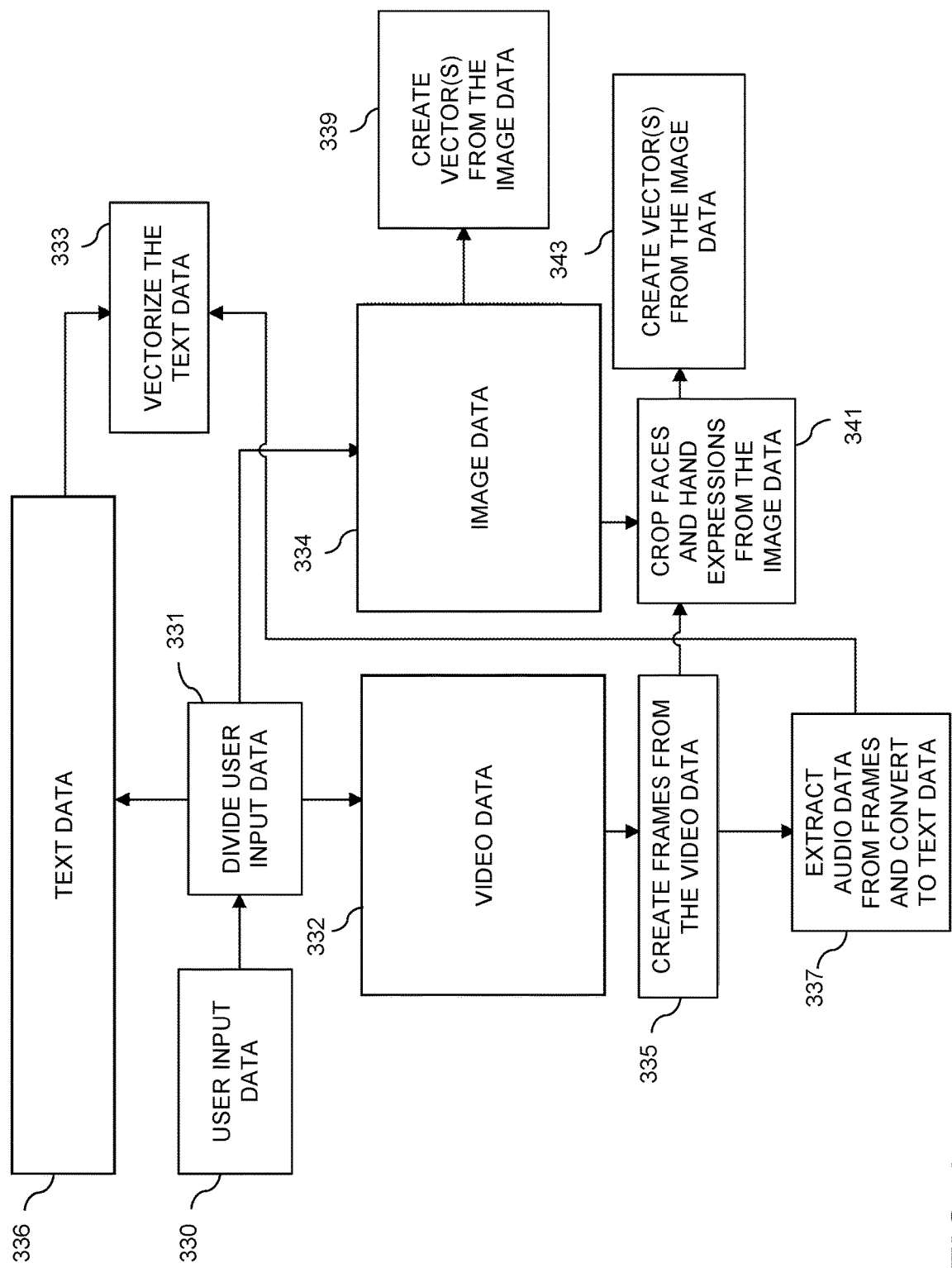
FIG. 3 shows example preprocessing of image data and video data in an illustrative embodiment.

FIG. 3 shows example preprocessing of image data and video data in an illustrative embodiment. By way of example, FIG. 3 depicts user input data 330, which can include, for example, text data, image data, video data, etc. As also depicted in FIG. 3, step 331 includes dividing and/or segregating at least a portion of user input data 330 into video data 332, image data 334, and text data 336.

Step 333 includes vectorizing at least a portion of the text data 336 using TF-IDF techniques. Also step 335 includes creating one or more frames from at least a portion of the video data 332, and step 337 includes extracting audio data from the one or more frames and converting such audio data to text data. The converted text data can then be vectorized via step 333.

As also depicted in FIG. 3, step 339 includes creating at least one vector from at least a portion of the image data 334. Additionally step 341 includes cropping one or more human faces and/or hand expressions from at least a portion of image data 334 and at least a portion of the one or more frames created in step 335. Further, step 343 includes creating at least one vector from at least a portion of the output of step 341.

Also, in one or more embodiments, data coming from different formats (e.g., text, GIFs, videos, and images) can be rendered and/or processed in one format as normalized modeling features. Based at least in part on an existing pattern in one or more features, Z-score normalization can be used (e.g., because data coming from different sources are at different scales). Z-score normalization can be carried out, for example, by subtracting the mean value of the feature from each value, and then dividing the resulting value by its standard deviation. In such an embodiment, due to a potentially large number of features, feature reduction techniques can be implemented, for example, using singular value decomposition (SVD), a dimensionality reduction technique, which can be represented via the following equation:

$$c_{m \times n} = U_{m \times r} \times \sum\nolimits_{r \times r} v_{r \times n}^1$$

wherein $U_{m \times r}$ represents a matrix of the orthonormal eigenvectors of $AA^T$, and $v_{r \times n}^1$ represents a transpose of an r×n matrix containing the orthonormal eigenvectors of $A^T A$.

At least one embodiment can also include implementing at least one final model for sentiment analysis. In such an embodiment, a neural network-based approach (e.g., a CNN-based approach) can be used, wherein high correlation in a feature matrix can impact the model, and SVD can be used in connection therewith. Further, one or more embodiments can also include using one or more orthogonal features extracted from SVD for the classification of one or more sentiments. As used herein, SVD refers to a matrix factorization method that generalizes the eigendecomposition of a square matrix (n×n) to any matrix (n×m). Because SVD is applicable to a square matrix, a raw matrix (e.g., A) can be multiplied by its transpose (e.g., $AA^T$). The resultant matrix is a square matrix. Using this result as input data, eigendecomposition can be used. Next, an eigenvalue is calculated, then an eigenvector is calculated using the highest eigenvalue. As such, in one or more embodiments, data can be decomposed into three parts: (1) a left singular matrix, which can include eigenvectors of matrix $AA^T$ ((e.g., a (m×r) matrix); (2) a diagonal matrix, which can contain singular (eigen)values (e.g., a (r×r) matrix); and (3) a right singular matrix, which can include eigenvectors of matrix $A^T A$ (e.g., a (r×n) matrix).

It is to be appreciated that some embodiments described herein utilize one or more artificial intelligence models. It is to be appreciated that the term "model," as used herein, is intended to be broadly construed and may comprise, for example, a set of executable instructions for generating computer-implemented classifications and/or predictions. For example, one or more of the models described herein may be trained to generate classifications and/or predictions based on text data and non-text data collected from user input sources, and such classifications and/or predictions can be used to initiate one or more automated actions (e.g., automatically initiating communication with a user and/or external system, initiating at least one remedial action in connection with a product or service, etc.).

Figure 4:
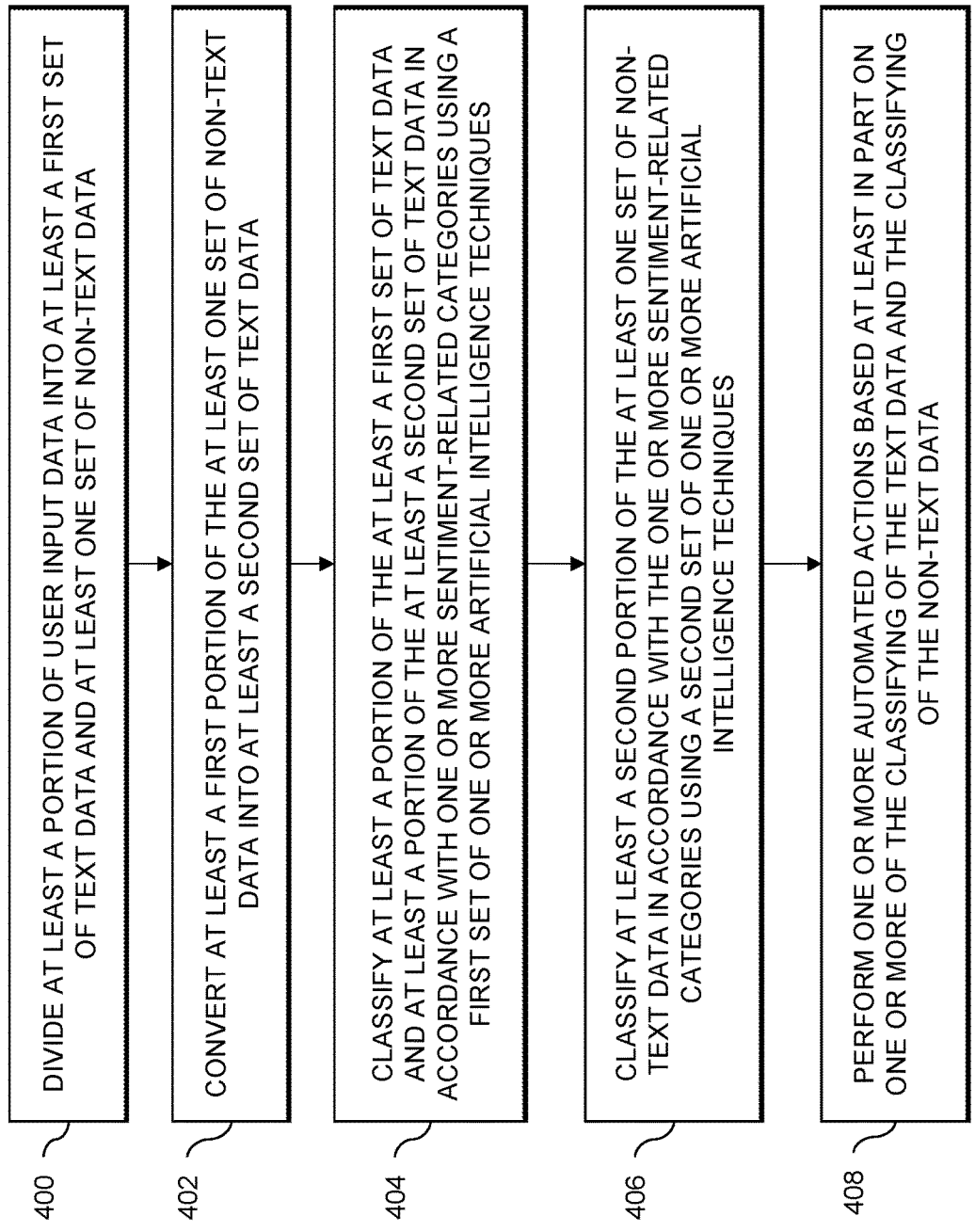
FIG. 4 is a flow diagram of a process for determining input sentiment by automatically processing text data and non-text data using artificial intelligence techniques in an illustrative embodiment.

FIG. 4 is a flow diagram of a process for determining input sentiment by automatically processing text data and non-text data using artificial intelligence techniques in an illustrative embodiment. It is to be understood that this particular process is only an example, and additional or alternative processes can be carried out in other embodiments.

In this embodiment, the process includes steps 400 through 408. These steps are assumed to be performed by the automated user input data sentiment determination system 105 utilizing elements 112, 114, 116 and 118.

Step 400 includes dividing at least a portion of user input data into at least a first set of text data and at least one set of non-text data. Step 402 includes converting at least a first portion of the at least one set of non-text data into at least a second set of text data. In at least one embodiment, converting at least a first portion of the at least one set of non-text data into at least a second set of text data includes processing the at least a first portion of the at least one set of non-text data using one or more speech-to-text conversion techniques.

Step 404 includes classifying at least a portion of the at least a first set of text data and at least a portion of the at least a second set of text data in accordance with one or more sentiment-related categories using a first set of one or more artificial intelligence techniques. In one or more embodiments, classifying at least a portion of the at least a first set of text data and at least a portion of the at least a second set of text data includes processing at least a portion of the at least a first set of text data and at least a portion of the at least a second set of text data using one or more support vector machines, one or more random forest techniques, and/or one or more text data tokenization techniques.

Additionally or alternatively, classifying at least a portion of the at least a first set of text data and at least a portion of the at least a second set of text data can include creating at least one numeric matrix by processing at least a portion of the at least a first set of text data and at least a portion of the at least a second set of text data using one or more TF-IDF techniques.

Step 406 includes classifying at least a second portion of the at least one set of non-text data in accordance with the one or more sentiment-related categories using a second set of one or more artificial intelligence techniques. In at least one embodiment, classifying at least a second portion of the at least one set of non-text data includes processing the at least a second portion of the at least one set of non-text data using at least one convolutional neural network. In such an embodiment, processing the at least a second portion of the at least one set of non-text data using at least one convolutional neural network includes generating one or more frames from the at least a second portion of the at least one set of non-text data in accordance with a given temporal parameter, identifying, in at least a portion of the one or more frames, at least one of one or more facial gestures and one or more body gestures by at least one individual, and mapping at least a portion of the at least one of one or more facial gestures and one or more body gestures by at least one individual to one or more feature values using the at least one convolutional neural network, wherein each of the one or more feature values is associated with at least one user sentiment.

Step 408 includes performing one or more automated actions based at least in part on one or more of the classifying of the text data and the classifying of the non-text data. In one or more embodiments, performing one or more automated actions includes automatically training at least a portion of the first set of one or more artificial intelligence techniques based at least in part on feedback related to the classifying of the text data. Such an embodiment can also include automatically training at least a portion of the second set of one or more artificial intelligence techniques based at least in part on feedback related to the classifying of the non-text data. Additionally or alternatively, performing one or more automated actions can include automatically initiating communication with at least one user associated with the user input data and/or automatically initiating at least one remedial action in connection with the user input data.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to determine input sentiment by automatically processing text data and non-text data using artificial intelligence techniques. These and other embodiments can effectively overcome problems associated with resource-intensive and error-prone approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
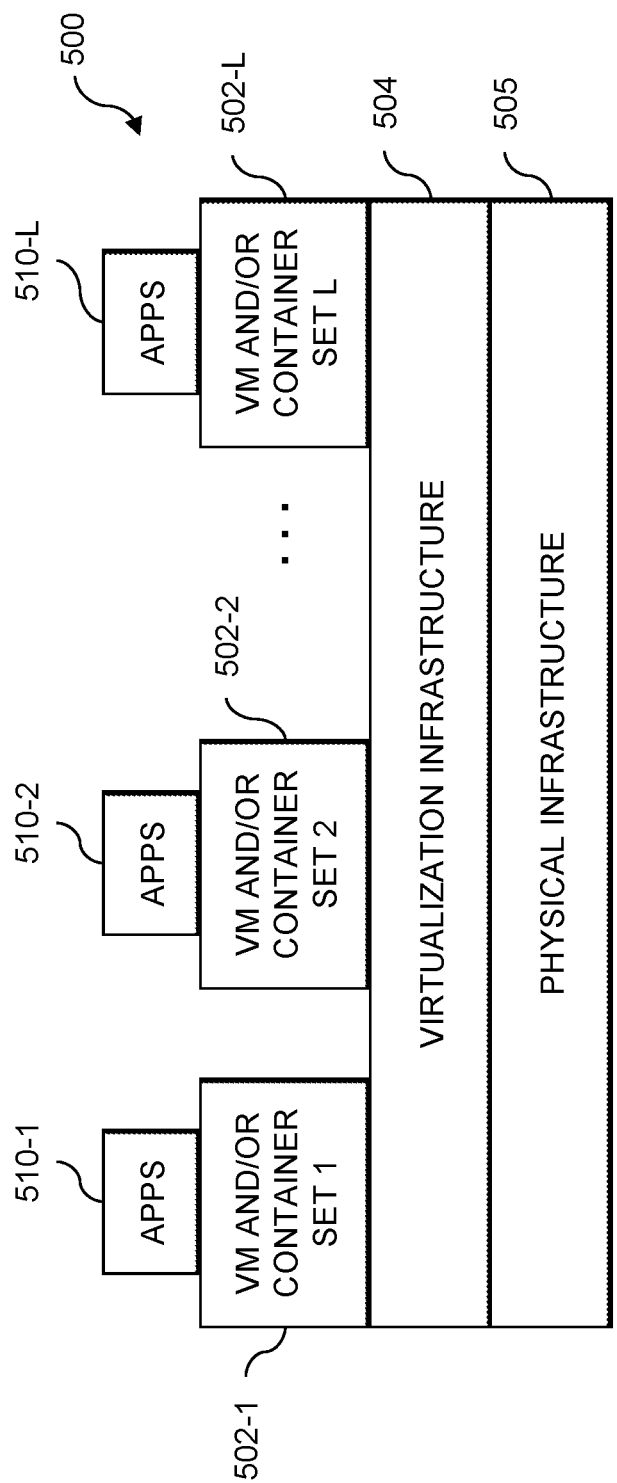
FIGS. 5 and 6 show examples of processing platforms that may be utilized to implement at least a portion of an information processing system in illustrative embodiments.
Figure 6:
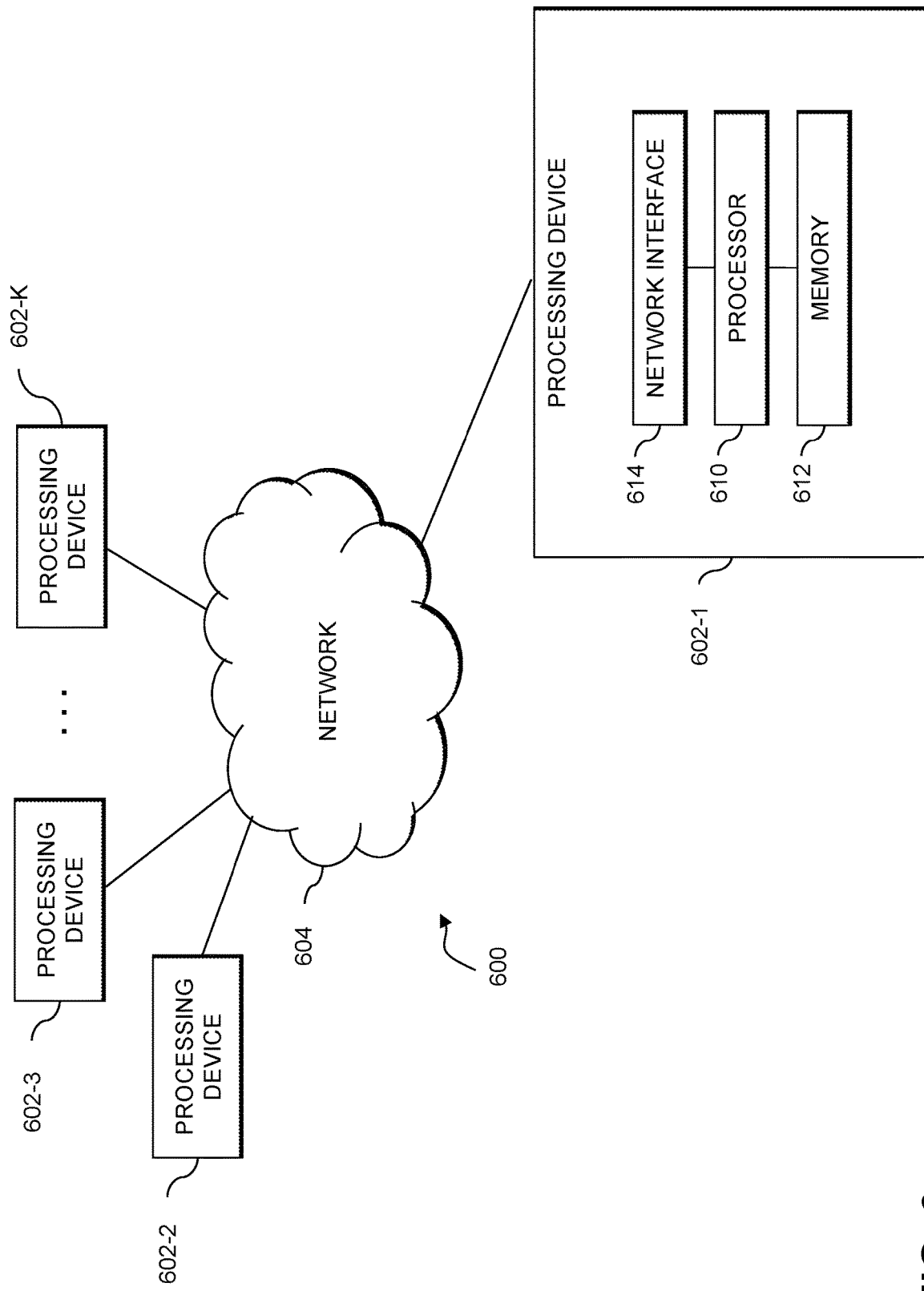

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    dividing at least a portion of user input data into at least a first set of text data and at least one set of non-text data;
    converting at least a first portion of the at least one set of non-text data into at least a second set of text data;
    classifying at least a portion of the at least a first set of text data and at least a portion of the at least a second set of text data in accordance with one or more sentiment-related categories using a first set of one or more artificial intelligence techniques;
    classifying at least a second portion of the at least one set of non-text data in accordance with the one or more sentiment-related categories using a second set of one or more artificial intelligence techniques, wherein classifying the at least a second portion of the at least one set of non-text data comprises:
        generating one or more frames from the at least a second portion of the at least one set of non-text data in accordance with at least one designated temporal parameter;
        identifying, in at least a portion of the one or more frames, at least one of one or more facial gestures and one or more body gestures by at least one individual; and
        mapping at least a portion of the at least one of one or more facial gestures and one or more body gestures to one or more feature values using at least one convolutional neural network, wherein each of the one or more feature values is associated with at least one designated sentiment; and
    performing one or more automated actions based at least in part on one or more of the classifying of the text data and the classifying of the non-text data;
    wherein the method is performed by at least one processing device comprising a processor coupled to a memory.

2. The computer-implemented method of claim 1, wherein classifying at least a portion of the at least a first set of text data and at least a portion of the at least a second set of text data comprises processing at least a portion of the at least a first set of text data and at least a portion of the at least a second set of text data using one or more support vector machines.

3. The computer-implemented method of claim 1, wherein classifying at least a portion of the at least a first set of text data and at least a portion of the at least a second set of text data comprises processing at least a portion of the at least a first set of text data and at least a portion of the at least a second set of text data using one or more random forest techniques.

4. The computer-implemented method of claim 1, wherein classifying at least a portion of the at least a first set of text data and at least a portion of the at least a second set of text data comprises creating at least one numeric matrix by processing at least a portion of the at least a first set of text data and at least a portion of the at least a second set of text data using one or more term frequency-inverse document frequency (TF-IDF) techniques.

5. The computer-implemented method of claim 1, wherein classifying at least a portion of the at least a first set of text data and at least a portion of the at least a second set of text data comprises processing at least a portion of the at least a first set of text data and at least a portion of the at least a second set of text data using one or more text data tokenization techniques.

6. The computer-implemented method of claim 1, wherein converting the at least a first portion of the at least one set of non-text data into the at least a second set of text data comprises processing the at least a first portion of the at least one set of non-text data using one or more speech-to-text conversion techniques.

7. The computer-implemented method of claim 1, wherein performing the one or more automated actions comprises automatically training at least a portion of the first set of one or more artificial intelligence techniques based at least in part on feedback related to the classifying of the text data.

8. The computer-implemented method of claim 1, wherein performing the one or more automated actions comprises automatically training at least a portion of the second set of one or more artificial intelligence techniques based at least in part on feedback related to the classifying of the non-text data.

9. The computer-implemented method of claim 1, wherein performing the one or more automated actions comprises at least one of automatically initiating communication with at least one user associated with the user input data and automatically initiating at least one remedial action in connection with the user input data.

10. A non-transitory processor-readable storage medium having stored therein program code of one or more software programs, wherein the program code when executed by at least one processing device causes the at least one processing device:
    to divide at least a portion of user input data into at least a first set of text data and at least one set of non-text data;
    to convert at least a first portion of the at least one set of non-text data into at least a second set of text data;
    to classify at least a portion of the at least a first set of text data and at least a portion of the at least a second set of text data in accordance with one or more sentiment-related categories using a first set of one or more artificial intelligence techniques;
    to classify at least a second portion of the at least one set of non-text data in accordance with the one or more sentiment-related categories using a second set of one or more artificial intelligence techniques, wherein classifying the at least a second portion of the at least one set of non-text data comprises:

generating one or more frames from the at least a second portion of the at least one set of non-text data in accordance with at least one designated temporal parameter;
identifying, in at least a portion of the one or more frames, at least one of one or more facial gestures and one or more body gestures by at least one individual; and
mapping at least a portion of the at least one of one or more facial gestures and one or more body gestures to one or more feature values using at least one convolutional neural network, wherein each of the one or more feature values is associated with at least one designated sentiment; and
to perform one or more automated actions based at least in part on one or more of the classifying of the text data and the classifying of the non-text data.

11. The non-transitory processor-readable storage medium of claim 10, wherein classifying at least a portion of the at least a first set of text data and at least a portion of the at least a second set of text data comprises processing at least a portion of the at least a first set of text data and at least a portion of the at least a second set of text data using one or more support vector machines.

12. The non-transitory processor-readable storage medium of claim 10, wherein classifying at least a portion of the at least a first set of text data and at least a portion of the at least a second set of text data comprises processing at least a portion of the at least a first set of text data and at least a portion of the at least a second set of text data using one or more random forest techniques.

13. The non-transitory processor-readable storage medium of claim 10, wherein classifying at least a portion of the at least a first set of text data and at least a portion of the at least a second set of text data comprises creating at least one numeric matrix by processing at least a portion of the at least a first set of text data and at least a portion of the at least a second set of text data using one or more TF-IDF techniques.

14. An apparatus comprising:
at least one processing device comprising a processor coupled to a memory;
the at least one processing device being configured:
to divide at least a portion of user input data into at least a first set of text data and at least one set of non-text data;
to convert at least a first portion of the at least one set of non-text data into at least a second set of text data;
to classify at least a portion of the at least a first set of text data and at least a portion of the at least a second set of text data in accordance with one or more sentiment-related categories using a first set of one or more artificial intelligence techniques;
to classify at least a second portion of the at least one set of non-text data in accordance with the one or more sentiment-related categories using a second set of one or more artificial intelligence techniques, wherein classifying the at least a second portion of the at least one set of non-text data comprises:
generating one or more frames from the at least a second portion of the at least one set of non-text data in accordance with at least one designated temporal parameter;
identifying, in at least a portion of the one or more frames, at least one of one or more facial gestures and one or more body gestures by at least one individual; and
mapping at least a portion of the at least one of one or more facial gestures and one or more body gestures to one or more feature values using at least one convolutional neural network, wherein each of the one or more feature values is associated with at least one designated sentiment; and
to perform one or more automated actions based at least in part on one or more of the classifying of the text data and the classifying of the non-text data.

15. The apparatus of claim 14, wherein classifying at least a portion of the at least a first set of text data and at least a portion of the at least a second set of text data comprises processing at least a portion of the at least a first set of text data and at least a portion of the at least a second set of text data using one or more support vector machines.

16. The apparatus of claim 14, wherein classifying at least a portion of the at least a first set of text data and at least a portion of the at least a second set of text data comprises processing at least a portion of the at least a first set of text data and at least a portion of the at least a second set of text data using one or more random forest techniques.

17. The apparatus of claim 14,
wherein converting the at least a first portion of the at least one set of non-text data into the at least a second set of text data comprises processing the at least a first portion of the at least one set of non-text data using one or more speech-to-text conversion techniques.

18. The apparatus of claim 14,
wherein performing the one or more automated actions comprises automatically training at least a portion of the first set of one or more artificial intelligence techniques based at least in part on feedback related to the classifying of the text data.

19. The apparatus of claim 14,
wherein performing the one or more automated actions comprises automatically training at least a portion of the second set of one or more artificial intelligence techniques based at least in part on feedback related to the classifying of the non-text data.

20. The apparatus of claim 14,
wherein performing the one or more automated actions comprises at least one of automatically initiating communication with at least one user associated with the user input data and automatically initiating at least one remedial action in connection with the user input data.

* * * * *